United States Patent [19]

Takeuchi et al.

[11] Patent Number: 4,468,496

[45] Date of Patent: Aug. 28, 1984

[54] POLYBUTADIENE RUBBER COMPOSITIONS

[75] Inventors: Yasumasa Takeuchi; Mitsuhiko Sakakibara; Nobuo Tagata, all of Yokkaichi; Masaki Ogawa, Sayama; Yasushi Hirata, Higashimurayama; Shigeru Tomihira, Kodaira, all of Japan

[73] Assignees: Bridgestone Tire Co., Ltd.; Japan Synthetic Rubber Co., Ltd., both of Tokyo, Japan

[21] Appl. No.: 401,509

[22] Filed: Jul. 26, 1982

[30] Foreign Application Priority Data

Jul. 31, 1981 [JP] Japan .............................. 56-119303

[51] Int. Cl.$^3$ .......................... C08L 9/00; C08L 9/02; C08L 47/00

[52] U.S. Cl. .................................... 525/233; 524/420; 525/235; 525/236; 525/237; 526/142; 526/153; 526/157; 526/340.4

[58] Field of Search ............... 525/235, 236, 237, 233; 524/420

[56] References Cited

U.S. PATENT DOCUMENTS 3,060,989  10/1962  Railsback et al. ................... 525/236

Primary Examiner—J. Ziegler
Attorney, Agent, or Firm—Sughure, Mion, Zinn, Macpeak and Seas

[57] ABSTRACT

A rubber composition having excellent fracture properties and cut growth resistance is disclosed, which consists of 10–95 parts by weight of polybutadiene having a content of cis-1,4 bond of at least 70% and an average chain length of 1,4-sequence of 110–450 and 90–5 parts by weight of at least one diene rubber.

8 Claims, No Drawings

POLYBUTADIENE RUBBER COMPOSITIONS

This invention relates to rubber compositions and curable rubber compositions each including polybutadiene with a particular average chain length of 1,4-sequence and having excellent fracture properties and cut growth resistance.

Heretofore, high cis-type polybutadiene rubber compositions have been applied for various members in tire industry such as sidewall rubber, tread rubber, rubber chafer, base rubber and the like because they are characterized by having an excellent flex resistance and a low energy loss. However, these conventional polybutadiene rubbers are small in the fracture properties and poor in the cut growth resistance as compared with the other diene rubbers, so that they are naturally restricted in use and also the blending ratio to the other rubber is restrained within a relatively low range. As a result, satisfactory polybutadiene rubber compositions are not yet obtained up to now.

The inventors have made various studies in order to improve the above mentioned drawback of the prior art and found that polybutadiene having a particular range of average chain length of 1,4-sequence provides a rubber composition having excellent fracture properties and cut growth resistance, and as a result the invention has been accomplished.

According to the invention, there is the provision of a rubber composition having excellent fracture properties and cut growth resistance, consisting of 10 to 95 parts by weight of polybutadiene having a content of cis-1,4 bond of at least 70% and an average chain length of 1,4-sequence of 110 to 450 and 90 to 5 parts by weight of at least one diene rubber.

The invention will be described in detail below.

The average chain length of 1,4-sequence defined in the invention is measured as follows. That is, the polybutadiene according to the invention is completely hydrogenated with p-toluenesulfonyl hydrazide according to a method disclosed in Makromol. Chem., 163, 1 (1973) to obtain a hydrogenation product to be tested. In this case, the completion of hydrogenation is confirmed by means of $H^1$-NMR. Then, the hydrogenation product or hydrogenated polybutadiene is measured with respect to average chain length of 1,4-sequence under the following conditions using a nuclear magnetic resonance (NMR) apparatus of FX-100 Model made by Nippon Denki Kabushiki Kaisha:

| | |
|---|---|
| Concentration of test sample | 300 mg/2 ml 1,2,4-trichlorobenzene with perdeuterobenzene, use of 10 mmφ probe for $^{13}$C-NMR, |
| Carrier frequency | 25.05 MHz, internal lock system, |
| Flip angle | 45° C., |
| Pulse width | 6 μsec, |
| Acquisition time | 5.0 sec, |
| Spectrum sweep width | 2 KHz, |
| Measuring temperature | 125° C., |
| Internal reference | HMDS, |
| Number of scan | 110 × 100 to 190 × 100 times. |

Further, average chain lengths of 1,2-sequence and 1,4-sequence are analyzed by the following equations according to a method disclosed in J. Polymer Sci., Polymer Physics Edition, 13, 1975 (1975):

$$\text{Average chain length of 1,2-sequence} = \frac{2I_5 + 2I_6 + I_8}{I_5 + I_8}$$

$$\text{Average chain length of 1,4-sequence} = \frac{8I_9 + 5I_{10} + 2I_{11}}{8I_9 + 4I_{10}}$$

, wherein each of $I_5$, $I_6$, $I_8$, $I_9$, $I_{10}$ and $I_{11}$ is an intensity of peak area at each of 37.2, 34.8, 34.0, 31.0, 30.5 and 30.0 ppm. The assignment of the analytical results is shown in the following Table 1.

TABLE 1

| Equation *1 | Assignment | Chemical shift (ppm) *2 |
|---|---|---|
| $I_1 = k \sum_{r=2}^{r} (r-1)N_{01(1)r10}$ | | 40.4 |
| $I_2 = kN_{010}$ | | 40.3 |
| $I_3 = 2k \sum_{r=1}^{r} N_{01(1)r10}$ | | 39.7 |
| $I_4 = kN_{0110}$ | | 39.0 |
| $I_5 = 2k \sum_{r=0}^{r} N_{01(1)r10}$ | | 37.2 |
| $I_6 = k \sum_{r=0}^{r} rN_{01(1)r10}$ | | 34.8 |

TABLE 1-continued

| Equation *1 | Assignment | Chemical shift (ppm) *2 |
|---|---|---|
| $I_7 = 2k \sum_{r=0}^{r} N_{01(1)r10}$ | | 34.5 |
| $I_8 = 2kN_{010}$ | | 34.0 |
| $I_9 = kN_{101}$ | | 31.0 |
| $I_{10} = 2k \sum_{s=0}^{s} N_{10(0)s01}$ | | 30.5 |
| $I_{11} = k \sum_{s=0}^{s} (4s + 3)N_{10(0)s01}$ | | 30.0 |
| $I_{12} = 2kN_{010}$ | | 27.3 |
| $I_{15} = kN_{010}$ | | 26.7 |
| $I_{16} = kN_{010}$ | | 11.1 |

Note
*1: Each of $I_1, I_2, \ldots, I_{16}$ shows an intensity of peak area at respective chemical shift, and r is 1,2-sequence, and s is 1,4-sequence.
*2: found value of chemical shift.

Further, a heat of fusion of the hydrogenation product of polybutadiene according to the invention is equivalent to the average chain length of 1,4-sequence, but it is preferable within a range of 42–135 cal/g. The heat of fusion is measured from a fusion peak area obtained by placing about 10 mg of the hydrogenated polybutadiene on an aluminum dish and raising temperature at a rate of 20° C./min in a differential scanning calorimeter (made by Rigaku Corp.). When the heat of fusion is less than 42 cal/g, the average chain length of 1,4-sequence does not reach into 110, while when the heat of fusion exceeds 135 cal/g, the average chain length of 1,4-sequence also exceeds 450.

The content of cis-1,4 bond is measured by means of the NMR apparatus.

The polybutadiene according to the invention having a particular average chain length of 1,4-sequence can be produced, for example, by polymerizing butadiene in the presence of a catalyst consisting of a combination of a compound of lanthanum series rare earth element (hereinafter referred to as Ln compound), an organoaluminum compound and Lewis acid and/or Lewis base.

As the Ln compound, there are used halides, carboxylates, alcoholates, thioalcoholates, amides and the like of metals having an atomic number of 57–71.

As the organoaluminum compound, there are used ones having a general formula of $AlR_1R_2R_3$, wherein $R_1$, $R_2$ and $R_3$ are the same or different and represent a hydrogen atom or a hydrocarbon residue having a carbon atom of 1–8, respectively.

As the Lewis acid, there are used aluminum halides having a general formula of $AlX_nR_{3-n}$, wherein X is a halogen atom, R is a hydrocarbon residue and n is 1, 1.5, 2 or 3, or the other metal halides.

The Lewis base is used for solubilizing the Ln compound in an organic solvent. For instance, acetylacetone, ketone and the like are preferably used.

The mole ratio of butadiene to Ln compound is $5 \times 10^2 - 5 \times 10^6$, preferably $10^3 - 10^5$. The mole ratio of $AlR_1R_2R_3$ to Ln compound is 5–500, preferably 10–300. The mole ratio of halide in Lewis acid to Ln compound is 1–10, preferably 1.5–5. The mole ratio of Lewis base to Ln compound is not less than 0.5, preferably 1–20.

According to the invention, the average chain length of 1,4-sequence is 110–450, preferably 130–300. When the average chain length is less than 110, there is no effect for the improvement of cut growth resistance, while when the average chain length exceeds 450, the resulting polybutadiene is apt to be fatigued. For instance, when the polybutadiene is subjected to repetitive stretching in a given direction over a long time, a tear strength after a cut is formed in parallel with the stretching direction considerably reduces.

The polybutadiene according to the invention has a content of cis-1,4 bond of at least 70%, preferably not less than 90%, more particularly 90–98%. When the content of cis-1,4 bond is less than 70%, the property of low energy loss disappears.

As the diene rubber to be used in the invention, mention may be made of natural rubber, polyisoprene rubber, styrene-butadiene copolymer rubber, acrylonitrile-butadiene copolymer rubber, ethylene-propylene-diene terpolymer rubber, isobutylene-isoprene copolymer rubber, halogenated-(isobutyleneisoprene copolymer) rubber and the like.

In the rubber composition according to the invention, the blending ratio of polybutadiene to diene rubber is 10–95 parts by weight to 90–5 parts by weight, preferably 30–95 parts by weight to 70–5 parts by weight. When the amount of polybutadiene rubber is less than 10 parts by weight, the blending effect is not obtained, while when the amount of polybutadiene exceeds 95 parts by weight, the roll workability becomes impractically poor.

To 100 parts by weight of the rubber composition according to the invention may be added 20–120 parts by weight of an inorganic filler and 0.5–10 parts by weight of a vulcanizing agent to form a curable rubber composition.

As the inorganic filler, use may be made of silicic anhydride, calcium carbonate, magnesium carbonate, talc, iron sulfide, iron oxide, bentonite, zinc white, diatomaceous earth, china clay, clay, alumina, titanium oxide, carbon black and the like. When the amount of inorganic filler is less than 20 parts by weight, sufficient reinforcing effect is not obtained, while when the amount of inorganic filler exceeds 120 parts by weight, the workability considerably lowers.

As the vulcanizing agent, mention may be made of sulfur, p-quinonedioxime, p,p'-dibenzoylquinonedioxime, 4,4'-dithiodimorpholine, poly-p-dinitrobenzene, ammonium benzoate, alkylphenol disulfide and the like. Further, such a vulcanizing agent may be used together with peroxide. When the amount of vulcanizing agent is less than 0.5 part by weight, sufficient vulcanizing effect cannot be expected, while when the amount of vulcanizing agent exceeds 10 parts by weight, the resulting vulcanizate is too hard and the elasticity of rubber in itself cannot be expected.

To the rubber composition according to the invention may be added additives usually used in rubber industry such as softener, process oil, pigment, vulcanization accelerator and the like in addition to the above mentioned additives. Carbon black is preferably to have an iodine adsorption number of 30–150 mg/g and a dibutyl phthalate adsorption number of 45–140 cm³/100 g.

The mixing of ingredients forming the rubber composition according to the invention is performed by means of roll mill, Banbury mixer, extruder or the like in the usual manner. In this case, it is favorable to uniformly mix these ingredients at a state near the order of molecule.

The rubber compositions according to the invention are excellent in the fracture properties and cut growth resistance, so that they can widely be used as industrial goods such as tires, conveyor belts, hoses and the like.

The following examples are given in illustration of the invention and are not intended as limitations thereof.

EXAMPLES 1–4

Into a sufficiently dried glass autoclave of 5 l capacity was charged 2.5 kg of cyclohexane under a nitrogen atmosphere and further 0.5 kg of butadiene, and then the temperature of the autoclave was raised to 60° C. A reaction product of 138.9 mM of triethylaluminum, 2.31 mM of diethylaluminum bromide, 0.926 mM of neodymium octenoate and 1.85 mM of acetylacetone was previously aged as a catalyst in another vessel in the presence of 0.1 g of butadiene and then charged into the autoclave at once to start polymerization. After two hours of polymerization, the degree of conversion reached to 100%. At this time, 5 ml of methanol solution containing 2,6-di-tert-butyl cresol as an antioxidant was poured into the autoclave to stop polymerization reaction. The resulting polymerization product was subjected to steam stripping in the usual manner and dried on a hot roll of 110° C. to obtain a polybutadiene, which is called as Sample No. 4 hereinafter.

In the following Table 2 are shown measured values of average chain length of 1,4-sequence, microstructure and calorimetric analysis of various polybutadiene samples.

In Table 2, Sample No. 1 is a polybutadiene rubber made by Anic Corp. using an uranium catalyst. Sample No. 2 is obtained by dissolving each of Sample Nos. 1 and 4 in n-hexane and blending them at a blending ratio of Sample No. 1 to Sample No. 4 of 1:4. Sample No. 3 is obtained by blending Sample No. 1 and Sample No. 4 at a blending ratio of 4:6 in the same manner as described on Sample No. 2. Sample No. 6 is a polybutadiene rubber made by Japan Synthetic Rubber Kabushiki Kaisha (trade name BR01). Sample No. 5 is obtained by dissolving each of Sample Nos. 4 and 6 in n-hexane and blending them at a blending ratio of Sample No. 4 to Sample No. 6 of 1:4. Sample No. 7 is a polybutadiene rubber made by Ube Kosan Kabushiki Kaisha (trade name UBEPOL 150). Sample No. 8 is a polybutadiene rubber made by Japan Synthetic Rubber Kabushiki Kaisha (trade name BR02). Sample No. 9 is a polybutadiene rubber made by Philips Chemical Company (trade name CIS-4 1203). Sample No. 10 is a polybutadiene rubber made by Asahi Kasei Kabushiki Kaisha (trade name DIENE 35 NF).

TABLE 2

| Polybutadiene | Average chain lengths of 1,4- and 1,2- sequences | | Microstructure | | | Calorimetric analysis | |
|---|---|---|---|---|---|---|---|
| | 1,4 | 1,2 | cis-1,4 (%) | trans-1,4 (%) | 1,2 (%) | Heat of fusion (cal/g) | Tm (°C.) |
| Sample No. 1 | 523 | 1.0 | 97.4 | 1.2 | 1.4 | 156 | 130 |
| Sample No. 2 | 441 | 1.0 | 97.0 | 1.5 | 1.5 | 130 | 129 |
| Sample No. 3 | 300 | 1.0 | 96.2 | 2.0 | 1.8 | 95 | 129 |
| Sample No. 4 | 152 | 1.0 | 95.3 | 2.5 | 2.2 | 51 | 129 |
| Sample No. 5 | 113 | 1.0 | 95.0 | 2.8 | 2.2 | 43 | 124 |
| Sample No. 6 | 106 | 1.0 | 94.9 | 2.9 | 2.2 | 43 | 123 |
| Sample No. 7 | 70 | 1.0 | 94.5 | 2.6 | 2.9 | 39 | 120 |
| Sample No. 8 | 20 | 1.0 | 94.2 | 2.5 | 3.3 | 32 | 112 |
| Sample No. 9 | 18 | 1.0 | 88.8 | 4.7 | 5.2 | 29 | 110 |
| Sample | 14 | 1.1 | 32.7 | 53.2 | 14.0 | 24 | 93 |

TABLE 2-continued

| Poly-buta-diene | Average chain lengths of 1,4- and 1,2-sequences | | Microstructure | | | Calorimetric analysis | |
|---|---|---|---|---|---|---|---|
| | 1,4 | 1,2 | cis-1,4 (%) | trans-1,4 (%) | 1,2 (%) | Heat of fusion (cal/g) | Tm (°C.) |
| No. 10 | | | | | | | |

Note
Heat of fusion (cal/g) was measured from the hydrogenated sample as previously mentioned.

Then, each polybutadiene of Sample Nos. 1–10 was used to form a rubber composition according to the following compounding recipe:

| Compounding recipe (part by weight): | |
|---|---|
| polybutadiene | 70 |
| natural rubber | 30 |
| carbon black HAF | 45 |
| aromatic oil | 5 |
| stearic acid | 2.0 |
| antioxidant (SANTOFLEX B) | 1.0 |
| zinc white | 3.0 |
| vulcanization accelerator (NOBS) | 1.0 |
| sulfur | 1.5 |

Then, the resulting rubber composition was cured under a curing condition of 140° C.×40 min and its cured properties were measured to obtain results as shown in the following Table 3.

TABLE 3

| | Sample No. | Tensile strength (kg/cm$^2$) | Resilience (R.T.) | Flex resistance | Cut growth resistance | Tear strength |
|---|---|---|---|---|---|---|
| Comparative example 1 | No. 1 | 241 | 67 | 98 | 254 | 71 |
| Example 1 | No. 2 | 237 | 68 | 154 | 207 | 104 |
| Example 2 | No. 3 | 239 | 69 | 176 | 256 | 103 |
| Example 3 | No. 4 | 238 | 70 | 188 | 299 | 105 |
| Example 4 | No. 5 | 235 | 68 | 111 | 289 | 101 |
| Comparative example 2 | No. 6 | 203 | 65 | 100 | 100 | 100 |
| Comparative example 3 | No. 7 | 201 | 65 | 100 | 98 | 102 |
| Comparative example 4 | No. 8 | 189 | 63 | 99 | 84 | 108 |
| Comparative example 5 | No. 9 | 199 | 67 | 95 | 102 | 105 |
| Comparative example 6 | No. 10 | 178 | 62 | 86 | 85 | 93 |

(1) The tensile strength was measured according to a method of JIS K6301.

(2) The resilience was measured by means of a Dunlop tripsometer according to a method of B.S. 903 (1950).

(3) The flex resistance was measured according to a flex fatigue test of JIS K6301. In this case, a time till crack occurred in a test piece having no cut is expressed by an index on a basis that Comparative Example 2 is 100.

$$\text{Flex resistance} = \frac{\text{Time till occurrence of crack in each test piece}}{\text{Time till occurrence of crack in Comparative Example 2}} \times 100$$

(4) The cut growth resistance was measured by forming a cut of 0.3 mm length in a center of a test piece having a size of 60 mm×100 mm×10 mm and giving a stretching strain to the test piece under conditions of vibration number of 300 cycles/min and strain of 50%. In this case, a time till cut grows to 20 mm is expressed by an index on a basis that Comparative Example 2 is 100.

$$\text{Cut growth resistance} = \frac{\text{Time till cut growth of 20 mm in each test piece}}{\text{Time till cut growth of 20 mm in Comparative Example 2}} \times 100$$

(5) The tear strength was measured in order to examine orientation fatigue property. After a test piece having a size of 150 mm×150 mm×2 mm was subjected to repetitive stretching of 200,000 times under conditions of 300 cycles/min and 50% strain, a sample of JIS No. 3 Dumb-bell shaped type was punched out from the test piece in a direction opposite to the stretching direction and a cut of 0.3 mm length was formed on the sample in the stretching direction. Then, the strength at rupture was measured by stretching the sample at a rate of 500 mm/min. Similarly, the strength at rupture was measured with respect to the test piece having no hysteresis.

$$\text{Tear strength} = \frac{\text{Strength at rupture after fatigue}}{\text{Strength at rupture before fatigue}} \times 100$$

EXAMPLES 5–9

The properties of cured rubber compositions were measured by changing the kind and amount of diene rubber, inorganic filler and vulcanizing agent to obtain results as shown in the following Table 4.

TABLE 4

| | Example 5 | Example 6 | Example 7 | Example 8 | Example 9 |
|---|---|---|---|---|---|
| Polybutadiene (Sample No. 4) | 50 | 50 | 50 | 30 | 30 |
| Natural rubber | 50 | 50 | 50 | 50 | 50 |
| SBR 1500 | — | — | — | 20 | 20 |
| Carbon black ISAF (1) | 20 | 45 | 75 | — | — |
| Carbon black GPF (2) | — | — | — | 40 | 40 |
| Silicic anhydride (3) | 2 | 10 | 10 | — | — |
| Clay (4) | — | — | 30 | — | — |
| Aromatic oil | 5 | 5 | 5 | — | — |
| SANTOFLEX B | 1 | 1 | 1 | 1 | 1 |

TABLE 4-continued

|  | Example 5 | Example 6 | Example 7 | Example 8 | Example 9 |
|---|---|---|---|---|---|
| Stearic acid | 2 | 2 | 2 | 2 | 2 |
| Zinc white | 3 | 3 | 3 | 3 | 3 |
| Vulcanization accelerator NOBS | 0.8 | 0.8 | 0.8 | 1.4 | 0.9 |
| Sulfur | 1.5 | 1.5 | 1.5 | 0.3 | 1.5 |
| Alkylphenol disulfide | — | — | — | 0.3 | 1.5 |
| Total amount of inorganic fillers (1) + (2) + (3) + (4) | 22 | 55 | 115 | 40 | 40 |
| Total amount of vulcanizing agents | 1.5 | 1.5 | 1.5 | 0.6 | 3.0 |
| Tensile strength (kg/cm$^2$) | 211 | 248 | 236 | 218 | 241 |
| Cut growth resistance | 182 | 285 | 145 | 148 | 150 |
| Flex resistance | 128 | 183 | 120 | 120 | 132 |

Silicic anhydride : made by Nippon Silica Kogyo Kabushiki Kaisha, NIPSIL VN-3 (trade name)
Clay: aluminum silicate, made by Shiraishi Calcium Kabushiki Kaisha, HARD TOP CLAY (trade name)

What is claimed is:

1. A rubber composition having excellent fracture properties and cut growth resistance, consisting of 10 to 95 parts by weight of polybutadiene having a content of cis-1,4 bond of at least 70% and an average chain length of 1,4-sequence of 110–450 and 90 to 5 parts by weight of at least one diene rubber.

2. The rubber composition according to claim 1, wherein said average chain length of 1,4-sequence of polybutadiene is 130 to 300.

3. The rubber composition according to claim 1, wherein said content of cis-1,4 bond of polybutadiene is at least 90%.

4. The rubber composition according to claim 1, wherein a heat of fusion of a hydrogenation product of said polybutadiene is 42 to 135 cal/g.

5. The rubber composition according to claim 1, wherein said diene rubber is selected from the group consisting of natural rubber, polyisoprene rubber, styrene-butadiene copolymer rubber, acrylonitrilebutadiene copolymer rubber, ethylene-propylene-diene terpolymer rubber, isobutylene-isoprene copolymer rubber and halogenated(isobutylene-isoprene copolymer) rubber.

6. The rubber composition according to claim 1, wherein the amount of said polybutadiene is 30 to 95 parts by weight and the amount of said diene rubber is 70 to 5 parts by weight.

7. The rubber composition according to claim 1, wherein said content of cis-1,4 bond of polybutadiene is at least 90–98%.

8. The rubber composition according to claim 1, wherein said polybutadiene is polymerized using a catalyst consisting of a combination of a compound of a lanthanum series rare earth element, an organoaluminum compound and at least one of a Lewis acid and Lewis base.

* * * * *